July 7, 1931.                H. V. REED                1,813,510
CLUTCH PLATE
Filed March 7, 1929
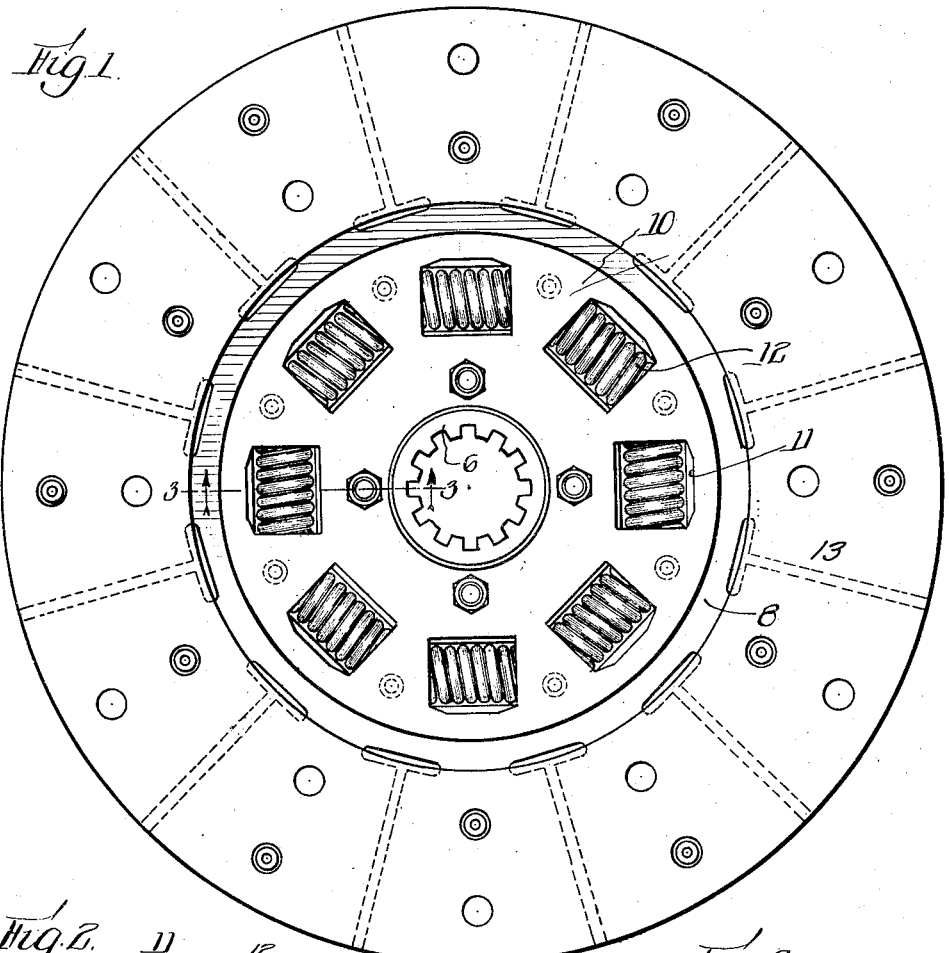
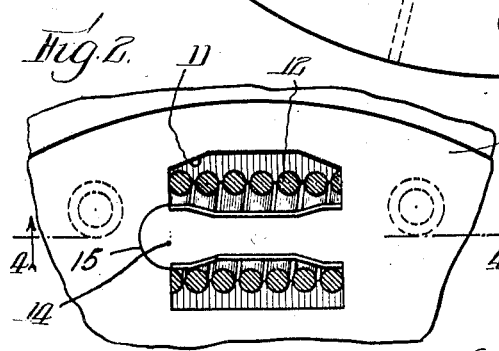
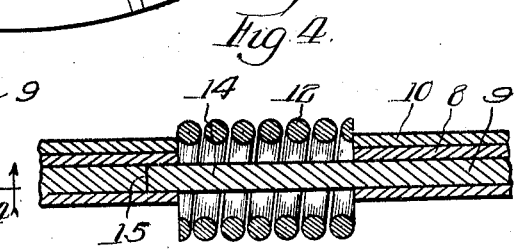
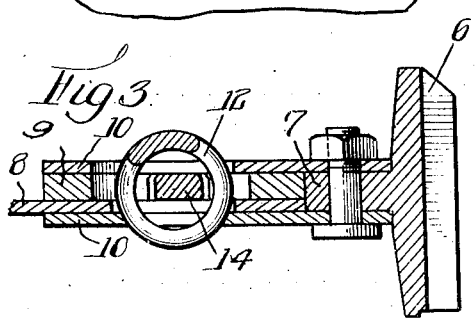
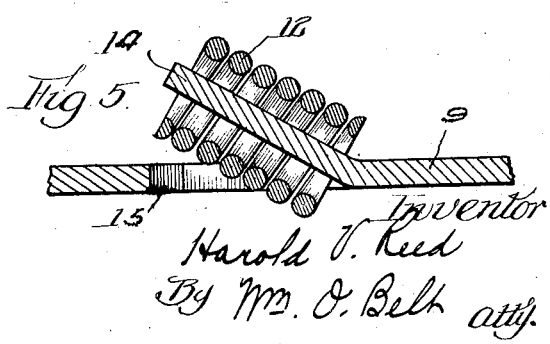
Inventor
Harold V. Reed
By Wm. O. Belt atty.

Patented July 7, 1931

1,813,510

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

CLUTCH PLATE

Application filed March 7, 1929. Serial No. 345,144.

This invention relates to friction clutches of the kind wherein a driven plate is interposed between two parts of a driving member and is adapted to be gripped or clamped by the parts under sufficient pressure to impart motion from the driving member to the driven member; and it relates more particularly to the cushion type of driven plate set forth in the application of Carl Martin Ahlene Serial No. 261,304 filed March 13, 1928, Patent No. 1,727,153, patented September 3, 1929, and in the joint application of Carl Martin Ahlene and myself Serial No. 325,568 filed December 12, 1928.

The object of this invention is to insure the retention of the cushion springs in the driven plate and to prevent these springs from becoming disarranged or disengaged from the plate during service of the clutch.

It has been found in practice that sometimes a cushion spring in a driven plate of this type will break or become disengaged and drop out of its place in the driven plate, thereby lessening the efficiency of the plate and the clutch and presenting the possibility of damage to parts of the clutch.

It is the object of my invention, more specifically, to provide the driven plate with retaining means for holding the cushion springs against any liability of becoming displaced from the seat in which they are intended to function.

In the accompanying drawings I have illustrated the invention in a selected embodiment and referring thereto Fig. 1 is a side elevation of the driven plate.

Fig. 2 is a detail enlarged view with a side plate removed to show the spring retaining arrangement.

Fig. 3 is a sectional view on the line 3—3 of Fig. 1.

Fig. 4 is a sectional view on the line 4—4 of Fig. 2.

Fig. 5 is a detail sectional view showing the manner of installing a cushion spring.

Referring to the drawings the driven plate comprises a friction member which is mounted upon a centrally disposed hub member, and coil springs are interposed between said members and mounted in a novel manner so that movement of the friction member is communicated through the spring cushion to the hub member without setting up vibrations in the clutch and without carrying forward engine vibrations to the transmission. The springs are retained in their seats in said members against accidental displacement but they are free to function in the desired manner and are protected against excess wear.

The hub member comprises a hub 6 having an integral peripheral flange 7. The friction member comprises a plate 8 in the form of a ring having a filler ring 9 riveted thereto and loosely mounted on the hub abutting the flange 7. Side plates 10, 10 are fastened by bolts or other suitable fastening devices to the hub flange 7 and these side plates overlap the friction plate 8, and its filler ring 9, Figs. 3, 4. These overlapping parts are provided with openings 11 to receive coil springs 12 which are seated in the openings with their ends engaging the end walls thereof. When the friction member, which is preferably provided with friction facings 13, is clamped between the engine flywheel and a pressure plate rotative movement is communicated from the friction member through the springs to the hub member and the shaft upon which it is mounted. In an automobile clutch, for example, the compression and expansion of the springs is often repeated at frequent intervals and while ordinary retaining means may be generally sufficient to keep the springs in their seats I consider it desirable to provide some means to absolutely prevent displacement of the springs. This is to guard against the possibility of defects in material and construction that are liable to occur in quantity production and escape inspection. For this purpose I provide one of the parts of the driven plate, such as the filler ring 9 with a bendable tongue 14 for each spring. The tongue extends lengthwise of the opening 11 and the spring 12 and is bent outward, Fig. 5, to receive the spring, after which it is bent inward into the plane of its ring, Fig. 4. The tongue is somewhat longer than the opening 11 and its free end fits in a recess 15 in the ring Fig. 2 so that the friction plate 8 and the opposite side plate 10 will overlap this end to hold it under normal conditions in its proper position, Fig. 4. The tongue projects through the middle of the spring and its edges may be beveled or rounded or smoothed off to prevent wear on the spring. The tongue provides a retainer which will prevent displacement of the spring under all conditions of use and even if the spring should break or the spring or the parts engaged thereby should wear unexpectedly. If the spring for any reason becomes ineffective it will be prevented from dropping out of its seat and possibly causing damage to other parts.

I have shown the invention in a simple embodiment but I do not limit myself thereto but reserve the right to make all such changes as may be necessary or desirable to adapt the invention for different driven plates and clutches and for other purposes within the scope of the following claims.

I claim:

1. A driven plate for friction clutches comprising two overlapping members having registering openings therein, springs seated in said openings, and fixed tongues in the openings of one of said members and extending through said springs.

2. A driven plate for friction clutches comprising two overlapping members having registering openings therein, a coil spring seated in each of said openings between the opposite walls thereof, tongues on one of said members integral with a wall of each of said openings and extended through and retaining said springs in said openings.

3. A driven plate for friction clutches comprising two overlapping members having registering openings therein, coil springs seated in said openings and engaging opposite walls thereof, and means for retaining said springs in said openings carried by one of said members projected interiorly of and throughout the length of said springs.

4. A driven plate for friction clutches comprising two overlapping members having registering openings therein, coil springs seated in said openings and engaging opposite walls thereof, and means for retaining said springs in said openings carried by one of said members and projecting from one end of said openings entirely through said springs.

5. A driven plate for friction clutches comprising two overlapping members and two side plates having registering openings therein, means for interconnecting said side plates, coil springs seated in said openings, and tongues on one of said members adapted to be laterally bent to receive said springs and then to be bent back into the plane of said member to hold said springs in place in said openings.

6. A driven plate for friction clutches comprising two overlapping members and two side plates having registering openings therein, means for interconnecting said side plates, coil springs seated in said openings, and tongues on one of said members adapted to be laterally bent to receive said springs and then to be bent back into the plane of said member to hold said springs in place in said openings, each tongue being fast at one end to the tongue carrying member, the tongue carrying member having recesses therein to receive the other ends of the tongues.

7. A driven plate for friction clutches comprising two overlapping members and two side plates having registering openings therein, means for interconnecting the overlapping members, means for interconnecting the side plates, coil springs seated in said openings, and tongues on one of said members adapted to be laterally bent to receive said springs and then to be bent back into the plane of said member to hold said springs in place in said openings, each tongue being fast at one end to the tongue carrying member, the tongue carrying member having recesses therein to receive the other ends of the tongues.

8. A plate for friction clutches comprising a member having openings therein and bendable tongues having one of the ends thereof connected to said member, said tongues being extended across said openings and having springs mounted thereon, and other members disposed on each side of said first named member having openings therein receiving said springs and having portions overlapping the free ends of said tongues for retaining said tongues in said openings.

9. A plate for friction clutches comprising a member having openings therein and bendable tongues having one of the ends thereof connected to said member, said tongues being extended across said openings and having the free ends thereof disposed in recesses in said member, springs mounted on said tongues, and other members disposed on each side of said first named member having openings therein receiving said springs and having portions overlapping the free ends of said tongues to retain said free ends in said recesses.

10. A plate for friction clutches comprising a member having openings therein and bendable tongues having one of the ends thereof connected to said member, said tongues being extended across said openings and having the free ends thereof disposed in recesses in said member, said tongues having the intermediate portions thereof restricted in width to define enlarged end portions, springs mounted on said tongues and engaged by said enlarged end portions, and other members disposed on each side of said first named member having openings therein receiving said springs and having portions overlapping the free ends of said tongues to retain said free ends in said recesses.

HAROLD V. REED.